(No Model.)
S. F. WELCH.
LOCKING DEVICE FOR EXTENSIBLE AXLES.
No. 573,836. Patented Dec. 22, 1896.
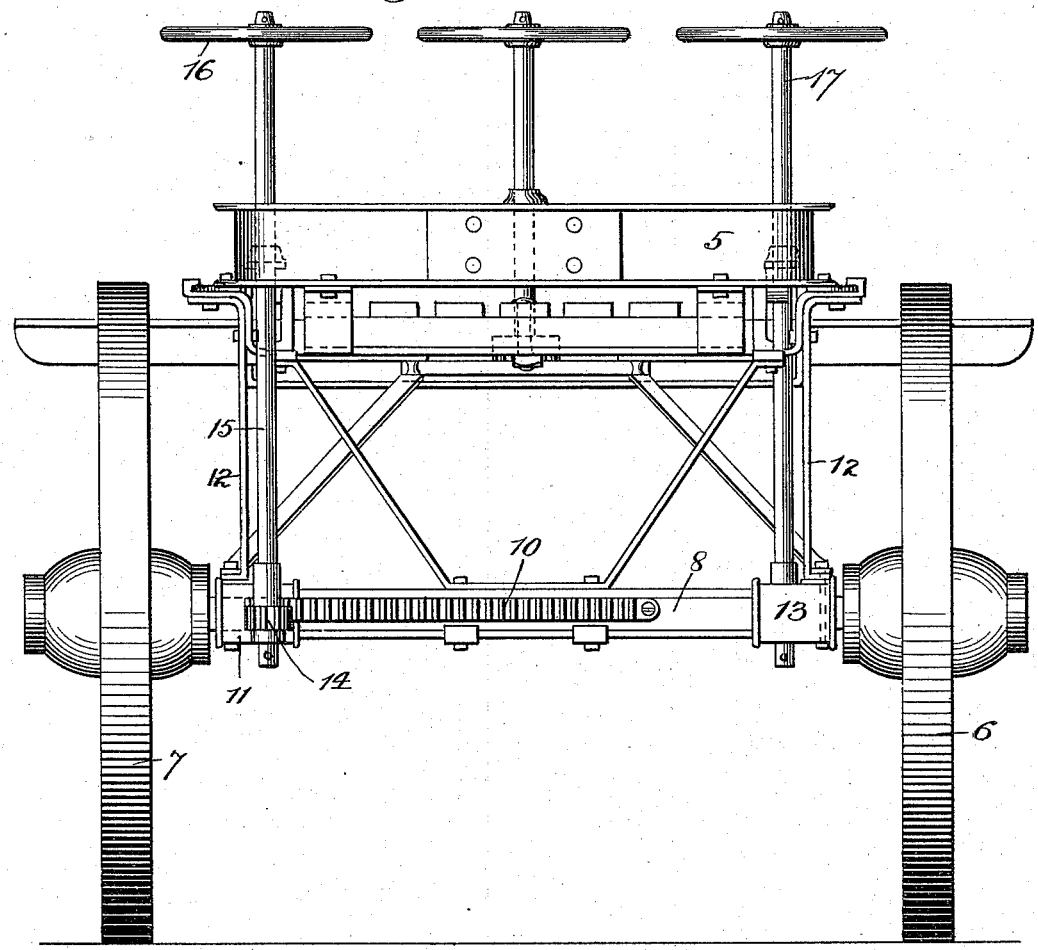
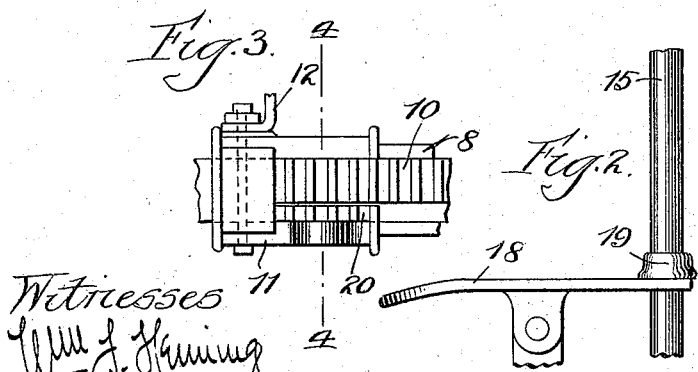
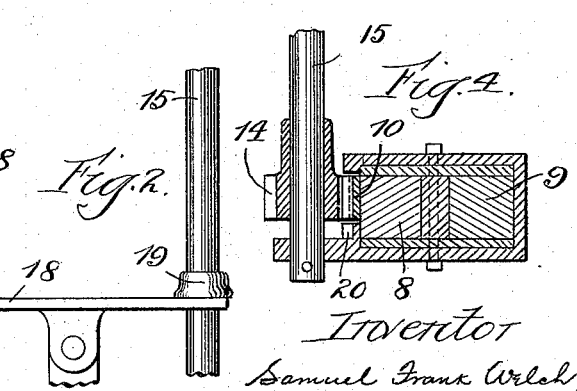

UNITED STATES PATENT OFFICE.

SAMUEL FRANK WELCH, OF AURORA, ILLINOIS, ASSIGNOR TO THE WESTERN WHEELED SCRAPER COMPANY, OF SAME PLACE.

LOCKING DEVICE FOR EXTENSIBLE AXLES.

SPECIFICATION forming part of Letters Patent No. 573,836, dated December 22, 1896.

Application filed November 30, 1895. Serial No. 570,716. (No model.)

*To all whom it may concern:*

Be it known that I, SAMUEL FRANK WELCH, a citizen of the United States, residing at Aurora, in the county of Kane and State of Illinois, have invented certain new and useful Improvements in Locking Devices for Extensible Axles, of which the following is a specification, reference being had to the accompanying drawings, in which—

Figure 1 is a rear elevation of a road-machine, showing my improvements. Fig. 2 is a detail showing the apparatus for shifting the hand-wheel shaft. Fig. 3 is an enlarged detail, being a partial rear view of an axle, illustrating the locking mechanism; and Fig. 4 is a section on line 4 4 of Fig. 3.

My invention relates to locking mechanism adapted to be used in connection with extensible axles for vehicles for locking the axles in their different positions of adjustment.

The object of my invention is to provide an extensible axle with new and improved locking mechanism; and it consists, broadly, in providing mechanism for locking the shifting pinion against rotation, and thereby through said pinion locking the extensible member of the axle. I accomplish this object as hereinafter specified and as illustrated in the drawings.

That which I regard as new will be set forth in the claims.

In the drawings, 5 indicates the frame of a road-machine, which is supported upon front and rear wheels in the usual manner. The rear wheels 6 7 only are illustrated in the drawings. 8 9 indicate the members of the axle, which are extensible in the usual manner. As the two extensible members of the axle are similarly operated, it will be necessary to describe only one, it being understood that the mechanism for adjusting each member of the axle is arranged near the spindle carried by such member. It will be understood also that instead of applying my improvements to vehicles both members of the axle of which are extensible they may be applied in cases where only one of such members is extensible.

Referring to Fig. 1, it will be seen that the extensible member 8 of the axle is provided with a rack 10, which is secured to it and extends through a sleeve 11, arranged near the wheel-spindle and secured to a bolster 12.

As illustrated in Fig. 1, the bolster may consist of a metallic framework connecting the axle to the frame of the scraper by means of the sleeve 11 and a similar sleeve 13 at the opposite side of the frame, or said bolster may be of any other suitable construction.

14 indicates a pinion which is mounted upon the lower end of a hand-wheel rod 15, carrying a hand-wheel 16, by means of which it may be rotated. A similar hand-wheel rod 17 is provided at the opposite end of the axle when said axle is provided with two extensible members. The hand-wheel rod 15 is vertically adjustable and may be moved vertically by a lever 18, which is supported upon the frame of the machine and engages a collar 19, secured upon the hand-wheel rod, as illustrated in Fig. 2 and indicated by dotted lines in Fig. 1. The weight of the rod normally holds it in its lowermost position, but it may readily be raised by pressing the foot-lever 18. When the rod 15 is in its lowermost position, the pinion 14 meshes with the rack 10 and also with fixed teeth 20, arranged on the sleeve 11 below the rack 10, as shown in Fig. 3; but when the rod 15 is raised, as above described, the pinion 14 will be raised out of mesh with the fixed teeth 20, permitting said pinion to be rotated to extend or retract the movable member of the axle. By this construction the rack 10 may be locked at any desired point, inasmuch as when the pinion 14 is in its lowermost position by its engagement with the stationary teeth, as well as with the rack 10, the rotation of such pinion would be prevented by its engagement with the stationary teeth, consequently locking the rack 10 and the extensible member 8 of the axle, to which it is connected.

I have shown my improved locking mechanism in connection with a road-machine, but it should be understood that it may be used in connection with other structures. Furthermore, I do not wish to be limited to the specific details of construction herein described, as various modifications may be made without departing from the spirit of my invention.

That which I claim as my invention, and desire to secure by Letters Patent, is—

1. In a locking device for the extensible axles of vehicles, the combination with a movable rack, of a pinion meshing with said rack for moving it, a longitudinally-movable shaft on which said pinion is mounted, and means independent of the rack and acting on the pinion to lock it against rotation, substantially as described.

2. In a locking device for the extensible axles of vehicles, the combination with an extensible axle, a rack thereon, and a fixed tooth, of a pinion adapted to mesh with said movable rack and movable into engagement with said fixed tooth without moving out of mesh with said rack, substantially as and for the purpose specified.

3. In a locking device for the extensible axles of vehicles, the combination with an extensible axle, a rack thereon, and a fixed projection adjacent thereto, of a lengthwise-movable shaft, and a pinion thereupon and adapted to mesh with said rack and to engage said fixed projection by the lengthwise movement of said shaft, substantially as described.

4. In a locking device for the extensible axles of vehicles, the combination with the extensible axle, a rack secured thereto, and a pinion adapted to mesh with said rack and to be rotated for extending or retracting said axle, of a longitudinally-movable shaft on which said pinion is mounted, and means acting directly upon the pinion for automatically locking it against rotation, substantially as described.

5. In a locking device for the extensible axles of vehicles, the combination with a movable rack, and a fixed projection arranged thereunder, of a vertically-movable shaft, a pinion mounted thereupon and adapted to mesh with said rack and to engage said fixed projection by the vertical movement of said shaft, and means for moving said shaft vertically, substantially as described.

6. In a locking device for the extensible axles of vehicles, the combination with a movable rack, a pinion meshing with said rack for moving it, and a rotary vertically-movable shaft carrying said pinion, of independent stationary teeth below the rack and in line with and adjacent to the rack-teeth, the said stationary teeth being adapted to act directly upon the pinion for automatically locking it against rotation, substantially as described.

7. The combination with a movable rack, of a pinion movable in a line parallel with its own axis and meshing with said rack and adapted to be rotated for moving the rack, and means independent of the rack and acting on the pinion to lock it against rotation, substantially as described.

8. The combination with a movable rack, and a fixed tooth or projection, of a pinion meshing with said rack and tooth and adapted to be rotated for moving said rack, said pinion being movable in a line parallel with its own axis out of engagement with said tooth without moving out of mesh with said rack, substantially as described.

9. The combination with a movable rack, and a stationary tooth adjacent to said rack, of a pinion adapted to engage said rack and tooth simultaneously and adapted to be rotated for moving said rack, said pinion being movable in a line parallel with its axis out of mesh with said tooth without moving out of mesh with said rack, substantially as described.

10. The combination with a movable rack, and a stationary tooth adjacent to said rack, of a pinion adapted to engage said rack and tooth simultaneously and movable in a line parallel with its axis out of mesh with said tooth without moving out of mesh with said rack and adapted to be rotated to move said rack, substantially as described.

SAMUEL FRANK WELCH.

Witnesses:
C. B. RUKGABER,
JOHN R. SIMPSON.